United States Patent [19]

Nel

[11] Patent Number: 4,716,648
[45] Date of Patent: Jan. 5, 1988

[54] METHODS OF SECURING A STATOR IN AN ELECTRICAL MACHINE

[75] Inventor: Gert Nel, Kloofendal, South Africa

[73] Assignee: Eastway Holdings Limited, Hayes, England

[21] Appl. No.: 797,975

[22] Filed: Nov. 14, 1985

Related U.S. Application Data

[63] Continuation-in-part of Ser. No. 589,002, Mar. 13, 1984, Pat. No. 4,564,780.

[30] Foreign Application Priority Data

Mar. 14, 1983 [ZA] South Africa ............... 83/1722

[51] Int. Cl.⁴ ............................................. H01R 15/14
[52] U.S. Cl. ............................. 29/596; 310/42; 310/62; 310/89; 310/258
[58] Field of Search ............... 29/596, 598; 310/42, 310/40 MM, 254, 258, 89, 62

[56] References Cited

U.S. PATENT DOCUMENTS

| | | |
|---|---|---|
| 1,415,564 | 5/1922 | Holahan .............................. 310/258 |
| 1,822,096 | 9/1931 | Hollander . |
| 1,978,100 | 10/1934 | Buerke . |
| 2,401,662 | 6/1946 | Divi . |
| 3,082,338 | 3/1963 | Turk ................................. 310/217 X |
| 3,519,857 | 7/1970 | Plumb . |
| 3,916,233 | 10/1975 | Vockler . |
| 4,007,386 | 2/1977 | Rustecki . |
| 4,051,399 | 9/1977 | Stanwick et al. . |
| 4,134,036 | 1/1979 | Curtiss ............................... 310/42 |
| 4,162,419 | 7/1979 | DeAngelis . |
| 4,318,218 | 3/1982 | Nelson .............................. 29/596 |

FOREIGN PATENT DOCUMENTS

| | | |
|---|---|---|
| 0017075 | 3/1980 | European Pat. Off. . |
| 268187 | 10/1912 | Fed. Rep. of Germany . |
| 1015153 | 8/1952 | France ............................. 310/258 |
| 176587 | 9/1961 | Sweden . |
| 915172 | 3/1982 | U.S.S.R. . |

Primary Examiner—Carl E. Hall
Attorney, Agent, or Firm—Burns, Doane, Swecker & Mathis

[57] ABSTRACT

A method is provided of securing a stator in an electrical machine which includes a casing, a rotor mounted within the casing and a stator which is axially slidable with respect to the casing. The method comprises the steps of wedging the stator in position by means of co-operating annular chamfer surfaces formed in mounting rings located at each end of the stator which co-operate with opposed chamfer surfaces formed on a plurality of mounting bars and a hollow cylindrical sleeve both of which form part of the casing. When the casing and stator assembly is pressed together, such as when the end plates of the motor are secured to the casing, the stator is wedged in position between the chamfer surfaces. The method can be utilized for reconditioning existing motors.

4 Claims, 2 Drawing Figures

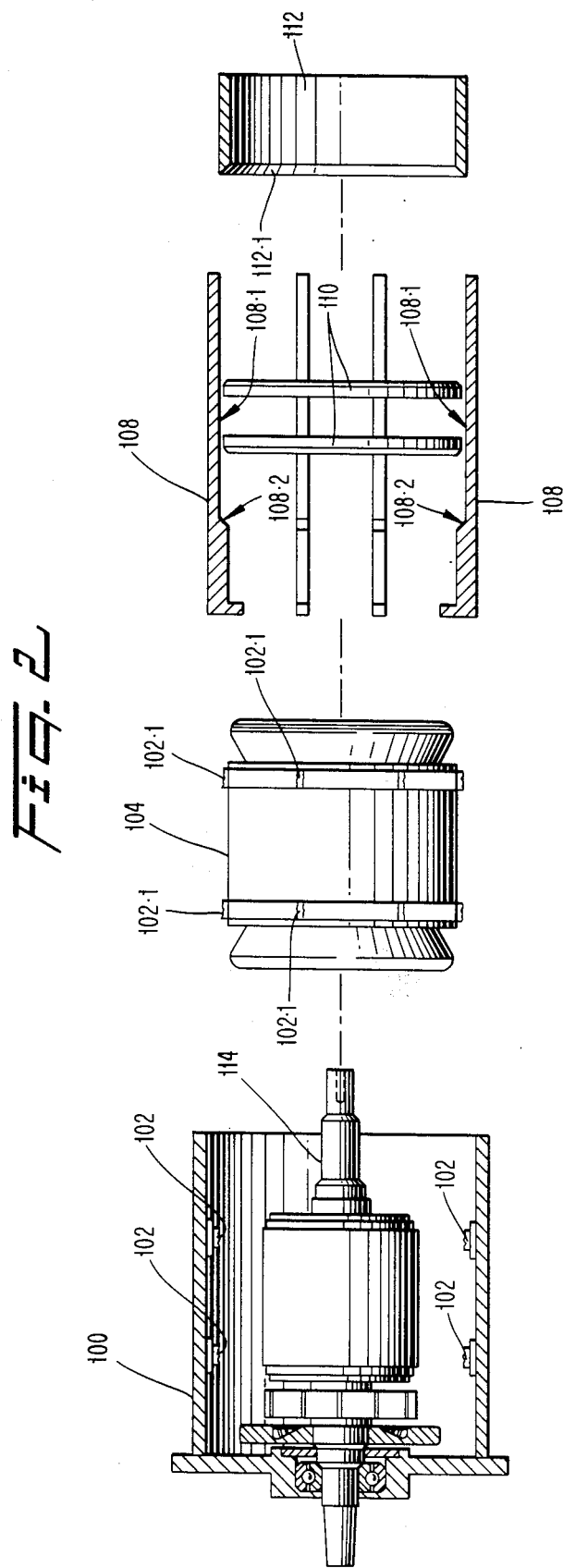

METHODS OF SECURING A STATOR IN AN ELECTRICAL MACHINE

RELATED INVENTION

This application is a Continuation-in-Part of U.S. Application Ser. No. 06/589,002 filed Mar. 13, 1984, issued as U.S. Pat. No. 4,564,780 on Jan. 14, 1986.

BACKGROUND TO THE INVENTION

This invention relates to a method of securing the stator of an electrical machine in the casing thereof as well as to a method of refurbishing existing electrical machines to adapt such machines to the use of the method of the invention.

By way of example, the invention will be described with reference to heavy duty electrical machines. Such machines are often subjected to extremely adverse operating conditions and in addition, are normally mechanically coupled to machinery in use, so that the electrical machines are not readily servicable on site. Where such a machine fails, mechanical decoupling of the machine from the driven apparatus such as a pump or mechanical cutter in a mine as well as disconnection of the machine from the electrical power supply is often necessary. Mechanical decoupling and disconnection as well as recoupling and reconnection has to be undertaken by skilled personnel and the entire machine needs to be removed and taken to a service workshop for repair or servicing resulting in considerable loss of production time.

It has been found that, in practice, faults occurring in the stators of electrical machines represent a frequent cause of electrical machine failure and it is an object of this invention to reduce the problems associated with the occurrence of stator faults.

SUMMARY OF THE INVENTION

A method is provided of securing a stator in an electrical machine including a casing, a rotor mounted within the casing and a stator which is axially slidable with respect to the casing and adapted for mounting co-axially about the rotor, the method comprising the steps of wedging the stator in position by means of co-operating annular chamfer surfaces at each end of the stator and pressing the casing and stator assembly together to ensure wedging in position of the stator.

The method may include the specific steps of arranging annularly extending, outwardly facing contact surfaces on the stator and annularly extending, inwardly facing locating surfaces within the casing in an axially spaced relationship, sandwiching the contact surfaces between the locating surfaces and wedging the stator in position by means of an end plate adapted, when secured to the end of the casing, axially to clamp the contact surfaces and locating surfaces together, the end plate being releasable to allow for unclamping of the chamfer surfaces and axial removal of the stator from the casing.

One of the locating surfaces may be defined by an end face of a hollow cylindrical sleeve which is adapted for insertion into the casing in such a manner that the contact surfaces are sandwiched between a locating surface within the casing and the locating surface on the end face of the hollow cylindrical sleeve by means of an end plate which is adapted to bear against the other end of the sleeve.

The invention includes a method of refurbishing an electrical machine including a casing, a rotor mounted within the casing and a stator mounted co-axially about the rotor, the method including the steps of removing the stator from the casing, arranging annularly extending, outwardly facing contact surfaces on the stator and arranging inwardly facing annular locating surfaces within the casing in axially spaced relationship and securing the stator in the casing by sandwiching the contact surface between the locating surfaces and applying a clamping pressure pressing the casing and stator assembly together.

This method may include the specific steps of arranging an inwardly facing locating surface within a distal end of the casing and forming a proximal locating surface on a hollow cylindrical sleeve, the end face of which is configured to define the proximal locating surface and sandwiching the contact surfaces between the inwardly facing distal and proximal locating surfaces by applying clamping pressure by means of an end plate adapted to bear against the other end of the sleevey.

DESCRIPTION OF THE DRAWINGS

The invention will be further described with reference to the accompanying drawings in which:

FIG. 2 is a similar side elevation of a prior art motor in the process of refurbishment in accordance with the method of the invention.

DESCRIPTION OF EMBODIMENTS OF THE INVENTION

Figure 1:
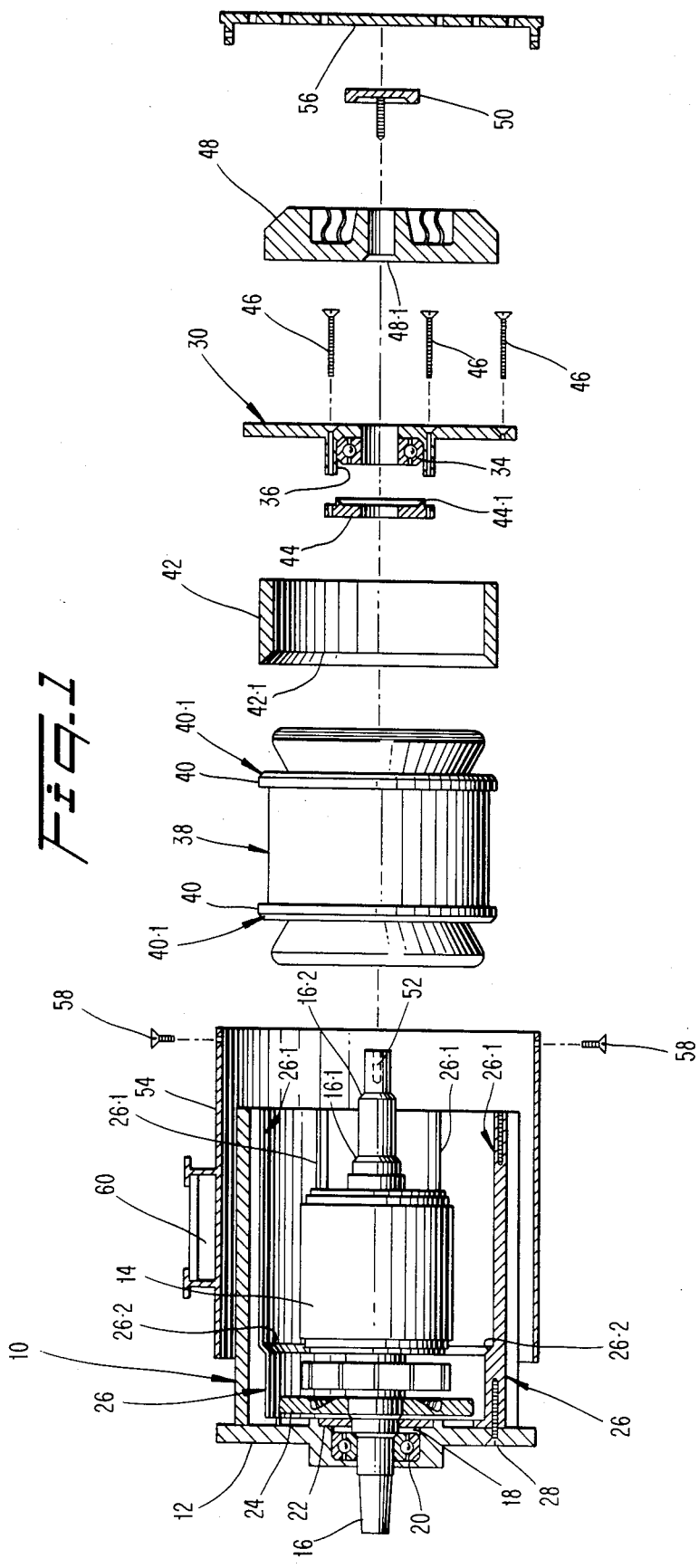
FIG. 1 is a schematic part-sectional and partly exploded side elevation of an electric motor the stator of which can be secured in accordance with the method of the present invention.

In FIG. 1, a motor with a casing 10 includes a first end plate 12 in which a rotor 14 is mounted by means of a rotor shaft 16 journalled in a bearing assembly constituted by a bearing housing 18, a roller bearing 20 and a housing cover plate 22. The rotor shaft 16 supports a rotary fan 24 which is keyed or otherwise secured to the shaft 16. A second end plate 30 which is secured to the casing 10 by means of machine screws 32 supports a roller bearing 34 in a bearing housing 36 within which the outer race of the bearing 34 is a sliding fit. The end of the rotor shaft 16 is journalled in the bearing 34 so that the shaft 16 is supported at both ends of the casing 10 by the end plates 12 and 30.

Six bars 26 are secured within the casing 10 by means of machine screws 28 securing the bars 26 at one end to the end plate 12 and the machine screws 32 securing the bars to the other end plate 30. In order to ensure the proper dimensional tolerance, the bars 26 are ground, after installation within the casing 10, by means of a grinder so that the separation of the inwardly directed surfaces 26.1 of the bars 26 is equal to the outside diameter of a stator 38 measured across a pair of mounting rings 40 secured to the stator.

The outwardly facing surfaces of the mounting rings 40 are chamfered at 40.1 and the bars 26 are chamfered at 26.2 to reduce the effective diametrical separation between the bars whereby the stator 38 is prevented from sliding beyond its operative position along the bars 26.

The stator 38 is prevented from moving in the opposite direction by a right circular cylindrical hollow sleeve 42 the one end face of which is chamfered at 42.1.

The chamfer angles on the bars 26, the mounting rings 40 and the sleeve 42 are all complemental. The sleeve 42 is dimensioned for the end plate 30 to bear against the sleeve 42 when the end plate 30 is secured to the casing 10 and to apply a clamping pressure to the mounting rings 40 whereby the chamfered surfaces 40.1, which constitute contact surfaces, are clamped between the inwardly facing locating surfaces constituted by the chamfered surface 26.2 on the bars 26 and the chamfered end face 42.1 of the sleeve 42.

To secure the stator 38 in the electrical machine, the stator 38 is slid axially into the casing 10 on the bars 26 and is then wedged in position by means of the chamfered contact surfaces 40.1 on the mounting rings 40 which are wedged between the chamfered locating surfaces constituted by the chamfer surfaces 26.2 and 42.1 on the bars 26 and the sleeve 42 respectively, when the casing and stator assembly are pressed together, since the end plate 30 is secured to the casing 10.

In order to remove the stator 38, the above procedure is merely reversed. The end plate 30 is removed to release the sleeve 42 which can be removed to release the stator. By merely sliding the stator 38 along the bars 26, the stator 38 can be removed from the casing 10 for servicing or repair.

The end bearing 34 which is retained in the bearing housing 36 on the end plate 30 has the outer race thereof secured against rotation relatively to the end plate 30 by the clamping action of a housing cover plate 44 which is formed with an integral inwardly facing chamfered clamping ring 44.1 adapted to engage a complemental chamfer on the outer race of the bearing 34. Machine screws 46 are used to secure the housing cover plate 44 to the bearing housing 36. The rotor shaft 16 is provided with an outwardly facing chamfer surface 16.1 which engages a complemental chamfer on the inner race of the bearing 34 to secure the inner race against rotation relatively to the rotor shaft 16 when the bearing 34 is pressed against the chamfer 16.1 by the action of securing the end plate 30 to the casing 10. The bearing 34 is secured entirely by means of the chamfer surfaces 44.1 and 16.1 engaging complemental chamfers on the outer and inner races of the bearing respectively and not by press fitting of the bearing 34 on either the shaft 16 or the housing 36, the bearing 34 being a sliding fit with respect to both these elements. It will be appreciated that this facilitates removal of the end plate and bearing assembly from the shaft 16 as well as the removal of the bearing 34 from the bearing housing 36.

The motor is provided with two air circulating fans 24 and 48. The fan 48 is readily removable, being secured in its operative position by a central cap 50 which screws into a threaded aperture 52 in the end of the rotor shaft 16. The fan 48 is a sliding fit on the end of the rotor shaft 16 and is secured against rotation relatively to the shaft by the provision of a chamfered surface 16.2 on the shaft 16 which engages a complemental chamfer 48.1 formed in the mounting aperture of the fan 48. When the cap 50 is screwed into the threaded apeture 52 with the fan 48 in position, the chamfered surfaces 16.2 and 48.1 engage frictionally to secure the fan 48 against rotation relatively to the shaft 16.

A casing cover 54 is secured over the casing 10 and is closed by an apertured casing cover plate 56 which is secured to the casing cover 54 by means of screws 58.

The stator 38 is provided with protruding male connectors (not shown) and the casing is provided with complemental female connectors (not shown) in the region of a terminal box 60. The male and female connectors disengage when the stator is slid to the right so that no separate electrical disconnection is required when removing the stator for service or repair.

A prior art motor can be refurbished or converted to enable the stator of such a prior art motor to be secured in the casing thereof using the method of the invention. Such a prior art motor is shown in FIG. 2 to comprise a casing 100 in which permanent brackets 102 are provided for the securement of the stator 104 of the machine. The stator 104 is provided, for instance, with a pair of hoops 106 to which the columnar parts of the brackets 102 may be secured by welding for example. In the drawing, the brackets 102 have been shown after severing thereof from the hoops 106 with the aid of the cutting torch, for instance, so that only jagged remnants 102.1 of the brackets 102 remain on the hoops 106. It will be appreciated that a number of methods exist by means of which stators can be secured in the casings of motors and the present example is used merely for ease of illustration. In principle the stator has to be removed from the casing in each case, the existing stator mountings have to be removed and stator mountings comprising chamfered locating surfaces and chamfered contact surfaces have to be secured to the casing and stator respectively to enable the stator to be secured in the casing in accordance with the method of the invention.

Once the stator 104 has been removed, the hoops 106 can be removed altogether or the jagged remnants 102.1 of the brackets 102 need merely be removed. In addition, the bracket remnants are removed from the interior of the casing 100 and the casing is prepared for the insertion of a plurality of mounting bars 108 which may be secured within the inner circumference of the casing 100. A pair of mounting rings 110 are then secured to the ends of the stator 104 and the casing 100 is prepared to receive a hollow cylindrical sleeve 112. Once the bars 108 have been secured within the casing 100 and the internally facing surfaces 108.1 have been ground down to the required diametrical separation distance, the stator 104 with the chamfered mounting rings 110 secured thereto can be inserted into the casing and slid along the bars until the interior or proximal mounting ring engages the chamfered locating surfaces 108.2 on the bars 108. Thereafter the sleeve 112 can be slid into the casing on the internally facing surfaces 108.1 of the bars 108 until the chamfered end face 112.1 of the sleeve 112 engages the chamfered contact surface of the outermost or proximal locating ring 110.

The sleeve 112 is dimensioned for the existing end plate (not shown) of the motor to clamp the contact surfaces constituted by the chamfers on the mounting rings 110 between the locating surfaces constituted by the chamfer surfaces 108.2 and 112.1 on the bars 108 and the sleeve 112 respectively. Alternatively, a special end plate can be prepared and used to ensure proper clamping of the contact surfaces between the locating surfaces.

To complete the conversion, the bearings on which the rotor shaft 114 is journalled in the end plates of the motor as well as the fans of the motor which are mounted on the rotor shaft 114 may be prepared for securement against rotation relatively to the shaft and the end plates by means of chamfers formed in the shaft 114 and the bearings, fans and end plates respectively in the manner described above. In addition, the stator 104 may be provided with push-in male electrical connectors (not shown) which are adapted to engage complemental female electrical connectors (not shown) when the rotor 104 is slid into the casing 100.

The stator can be removed and re-installed in the manner described with reference to FIG. 1.

I claim:

1. A method of securing a stator in an electrical machine including a casing, at least one end plate adapted for securement to an end of the casing, a rotor mounted within the casing and a stator which is axially slidable with respect to the casing and adapted for mounting co-axially about the rotor, the method comprising the steps of arranging annularly extending, outwardly facing contact surfaces on the stator and annularly extending inwardly facing locating surfaces within the casing in an axially spaced relationship, sandwiching the contact surfaces between the locating surfaces and clamping the stator in position by securing the end plate to the end of the casing axially to clamp the contact surfaces and locating surfaces together, the end plate being releasable to allow for unclamping of the locating and contact surfaces and axial removal of the stator from the casing.

2. A method according to claim 1 including the step of providing a hollow cylindrical sleeve, which is adapted to fit within the casing and an end of which is configured to define one said locating surface and sandwiching the contact surfaces between another said locating surface within the casing and said one locating surface on the end face of the hollow cylindrical sleeve by means of the end plate which is adapted to bear against the other end of the sleeve.

3. A method according to claim 1 including the step of forming said locating surfaces and contact surfaces with chamfers so that said stator is wedged in position during said clamping.

4. A method according to claim 1 wherein said contact surfaces are on annular rings, and said rings are attached to axial ends of said stator.

* * * * *